US010634044B2

(12) United States Patent
Hong et al.

(10) Patent No.: US 10,634,044 B2
(45) Date of Patent: Apr. 28, 2020

(54) ENGINE SYSTEM AND METHOD USING THE SAME (71) Applicants: HYUNDAI MOTOR COMPANY, Seoul (KR); KIA MOTORS CORPORATION, Seoul (KR)

(72) Inventors: Seungwoo Hong, Seoul (KR); Jong Il Park, Seoul (KR); Heechang Oh, Suwon-si (KR); Yeongseop Park, Seoul (KR); Dong Hee Han, Seoul (KR); Hyungbok Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/158,515

(22) Filed: Oct. 12, 2018

(65) Prior Publication Data

US 2019/0368414 A1 Dec. 5, 2019

(30) Foreign Application Priority Data

Jun. 5, 2018 (KR) .................... 10-2018-0064940

(51) Int. Cl.
*F02B 39/10* (2006.01)
*F02B 29/04* (2006.01)
(Continued)

(52) U.S. Cl.
CPC .......... *F02B 39/10* (2013.01); *F02B 29/0406* (2013.01); *F02B 33/34* (2013.01);
(Continued)

(58) Field of Classification Search
CPC ...... F02B 39/10; F02B 29/0406; F02B 33/34; F02D 41/0007; F02D 23/00; F05D 2220/40
(Continued)

(56) References Cited

U.S. PATENT DOCUMENTS 4,236,492 A * 12/1980 Tholen ...................... F01P 3/18
123/563
9,534,532 B2 * 1/2017 Eybergen ................ F02B 33/38
(Continued)

FOREIGN PATENT DOCUMENTS

JP     H05-005419 A     1/1993
JP     2007-187080 A    7/2007
(Continued)

OTHER PUBLICATIONS

Extended European Search Report dated Mar. 7, 2019 from the corresponding European Application No. 18201174.2, 7 pp.

*Primary Examiner* — Hoang M Nguyen
(74) *Attorney, Agent, or Firm* — Brinks Gilson & Lione (57) ABSTRACT An engine may include a plurality of cylinders generating driving torque by burning fuel; a first intake valve disposed in a first intake line in which intake air supplied to the cylinders flows; a second intake valve disposed in a second intake line in which intake air supplied to the cylinders flows; a first electric supercharger disposed in the first intake line; a second electric supercharger disposed in the second intake line; a bypass valve disposed in a bypass line connecting the first intake line and the second intake line; and a controller for controlling the first electric supercharger and the second electric supercharger to be operated in a single mode, a serial mode, or a parallel mode based on an operating region of the engine determined by driving information.

12 Claims, 9 Drawing Sheets

(51) Int. Cl.
    *F02B 33/34*     (2006.01)
    *F02D 23/00*     (2006.01)
    *F02D 41/00*     (2006.01)

(52) U.S. Cl.
    CPC ......... *F02D 23/00* (2013.01); *F02D 41/0007* (2013.01); *F05D 2220/40* (2013.01)

(58) Field of Classification Search
    USPC .... 60/600, 605.1, 612; 123/559.1, 562, 563, 123/564
    See application file for complete search history.

(56) References Cited

U.S. PATENT DOCUMENTS

| | | | |
|---|---|---|---|
| 9,638,095 B1* | 5/2017 | Clarke | F02D 11/10 |
| 9,856,781 B2* | 1/2018 | Tsourapas | F02B 33/36 |
| 2006/0021347 A1* | 2/2006 | Sun | F02B 37/013 |
| | | | 60/612 |
| 2016/0312687 A1* | 10/2016 | Kemmerling | F02B 37/002 |
| 2018/0163616 A1* | 6/2018 | Han | F02D 41/0007 |

FOREIGN PATENT DOCUMENTS

| | | |
|---|---|---|
| WO | 97-18388 | 5/1997 |
| WO | 2017-211564 A1 | 12/2017 |

\* cited by examiner

ENGINE SYSTEM AND METHOD USING THE SAME

CROSS-REFERENCE TO RELATED APPLICATION

This application claims priority to and the benefit of Korean Patent Application No. 10-2018-0064940, filed on Jun. 5, 2018, the entire contents of which are incorporated herein by reference.

FIELD

The present disclosure relates to an engine system. More particularly, the present disclosure relates to an engine system and a method using the same that can realize a high compression ratio engine and improve a driving efficiency of an electric supercharger.

BACKGROUND

The statements in this section merely provide background information related to the present disclosure and may not constitute prior art.

An engine appropriately mixes air and fuel and generates driving power by burning the mixed gas.

In order to output desired power and combustion efficiency, sufficient air should be supplied to the engine. For this, a turbocharger is used to increase combustion efficiency and supply sufficient air to the engine.

Generally, a turbine of the turbocharger is rotated by pressure of exhaust gas exhausted from the engine, a compressor of the turbocharger compresses fresh air flowing in from the outside, and the compressed air is supplied to a cylinder of the engine. The turbocharger has been applied to most diesel engines, and has recently been applied to gasoline engines.

As another example, there is an electric supercharger that compresses external air using a compressor operated by a motor. Since the electric supercharger is operated by the motor, there is little turbo lag. The electric supercharger mainly supplies compressed air to the cylinder in a low speed and low load region.

We have discovered that since the turbocharger (hereinafter referred to as a 'mechanical turbocharger') operated by exhaust gas has low responsiveness, there is a problem in realizing an engine having a high compression ratio because of high back pressure. Also, since the turbocharger is exposed to high temperature exhaust gas (i.e., Celsius 700 degrees), design cost of peripheral parts of the turbocharger is increased.

Further, since the output power of the motor is limited according to an output of a battery provided in a vehicle, the usage of the electric supercharger is limited to low and middle speed regions.

SUMMARY

The present disclosure provides an engine system and a method using the same that can realize a high compression ratio engine and improve a driving efficiency of an electric supercharger.

An engine system according to an exemplary form of the present disclosure may include: an engine including a plurality of cylinders generating driving torque by burning fuel; a first intake valve disposed in a first intake line in which intake air supplied to the cylinders flows; a second intake valve disposed in a second intake line in which intake air supplied to the cylinders flows; a first electric supercharger disposed in the first intake line; a second electric supercharger disposed in the second intake line; a bypass valve disposed in a bypass line connecting the first intake line and the second intake line; and a controller configured to control the first electric supercharger and the second electric supercharger to be operated in a single mode, a serial mode, or a parallel mode based on an operating region of the engine determined by driving information. In particular, the single mode is a mode that intake air compressed by one of the two electric superchargers (i.e., the first electric supercharger, the second electric supercharger) is supplied to the cylinder, the serial mode is a mode that intake air is doubly compressed by the first electric supercharger and the second electric supercharger and supplied to the cylinder, and the parallel mode is a mode that intake air compressed by the first electric supercharger and intake air compressed by the second electric supercharger, respectively, are supplied to the cylinder.

In the single mode, the controller may control the second intake valve and the bypass valve to be closed, the second electric supercharger to be stopped, the first intake valve to be opened, and the first electric supercharger to be operated, such that the intake air compressed by the first electric supercharger is supplied to the cylinder, or control the first intake valve and the bypass valve to be closed, the first electric supercharger to be stopped, the second intake valve to be opened and the second electric supercharger to be operated, such that the intake air compressed by the second electric supercharger is supplied to the cylinder.

When the operating region of the engine is in a middle speed and middle load region, the controller may control the electric superchargers to be operated in the single mode.

In the serial mode, the controller may control the first intake valve and the second intake valve to be closed, the bypass valve to be opened, the first electric supercharger and the second electric supercharger to be operated, such that the intake air doubly compressed by the first electric supercharger and the second electric supercharger is supplied to the cylinder.

When the operating region of the engine is a low speed and low load region, a low speed and high load region, or a middle speed and high load region, the controller may controls the first and second electric superchargers to be operated in the serial mode.

In the parallel mode, the controller may control the bypass valve to be closed, the first intake valve and the second intake valve to be opened, and the first electric supercharger and the second electric supercharger to be operated, such that the intake air compressed by the first electric supercharger and the intake air compressed air compressed by the second electric supercharger are supplied to the cylinder.

When the operating region of the engine is a high speed and middle load region or a high speed and high load region, the controller may control the first and second electric supercharger to be operated in the parallel mode.

The first intake valve may be disposed in a downstream portion of the first electric supercharger, and the second intake valve may be disposed in an upstream portion of the second electric supercharger.

The engine system may further include a main intercooler disposed in a main intake line that the first intake line and the second intake line are merged.

The engine system may further include a complementary intercooler disposed in the bypass line.

In another form of the present disclosure, a method for controlling an engine system including a first intake valve disposed in a first intake line in which intake air supplied to a cylinder of an engine flows, a second intake valve disposed in a second intake line in which intake air supplied to a cylinder of an engine flows, a first electric supercharger disposed in the first intake line, a second electric supercharger disposed in the second intake line, and a bypass valve disposed in a bypass line connecting the first intake line and the second intake line, may include detecting, by a driving information detector, a driving information including an engine speed and an engine torque; determining, by a controller, an operating region of the engine based on the driving information; and controlling, by the controller, the first electric supercharger and the second electric supercharger to be operated in a single mode, a serial mode, or a parallel mode based on the operating region; wherein the single mode is a mode that intake air compressed by one of the two electric superchargers is supplied to the cylinder, the serial mode is a mode that intake air is doubly compressed by the first electric supercharger and the second electric supercharger and supplied to the cylinder, and the parallel mode is a mode that intake air compressed by the first electric supercharger and intake air compressed by the second electric supercharger, respectively, are supplied to the cylinder.

In the single mode, the second intake valve and the bypass valve may be closed, the second electric supercharger may be stopped, the first intake valve may be opened, and the first electric supercharger may be operated, such that intake air compressed by the first electric supercharger is supplied to the cylinder, or the first intake valve and the bypass valve may be closed, the first electric supercharger may be stopped, the second intake valve may be opened, and the second electric supercharger may be operated, such that intake air compressed by the second electric supercharger is supplied to the cylinder.

In the serial mode, the first intake valve and the second intake valve may be closed, the bypass valve may be opened, and the first electric supercharger and the second electric supercharger may be operated, such that intake air doubly compressed by the first electric supercharger and the second electric supercharger is supplied to the cylinder.

In the parallel mode, the bypass valve may be closed, the first intake valve and the second intake valve may be opened, and the first electric supercharger and the second electric supercharger may be operated, such that intake air compressed by the first electric supercharger and intake air compressed air compressed by the second electric supercharger are supplied to the cylinder.

The first and second electric superchargers may be operated in the serial mode when the operating region of the engine is a low speed and low load region, a low speed and high load region, or a middle speed and high load region.

The first electric supercharger or the second electric supercharger may be operated in the single mode when the operating region of the engine is in a middle speed and middle load region.

The first and second electric superchargers may be operated in the parallel mode when the operating region of the engine is a high speed and middle load region or a high speed and high load region.

According to an exemplary form of the present disclosure, since the electric superchargers are operated in an optimal efficiency operating point and energy efficiency is improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In describing the present disclosure, parts that are not related to the description will be omitted. Like reference numerals generally designate like elements throughout the present disclosure.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

Hereinafter, an engine system according to an exemplary form of the present disclosure will be described in detail with reference to accompanying drawings.

Figure 1:
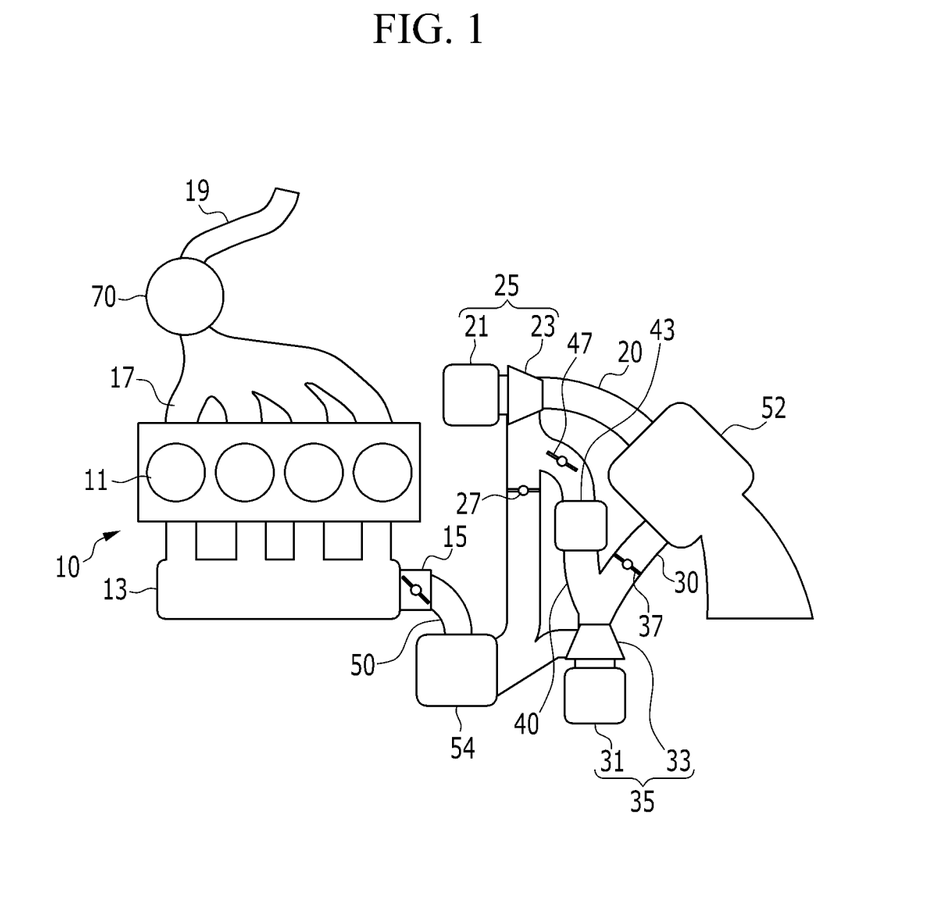
FIG. 1 is a schematic view illustrating an engine system according to an exemplary form of the present disclosure.
Figure 2:
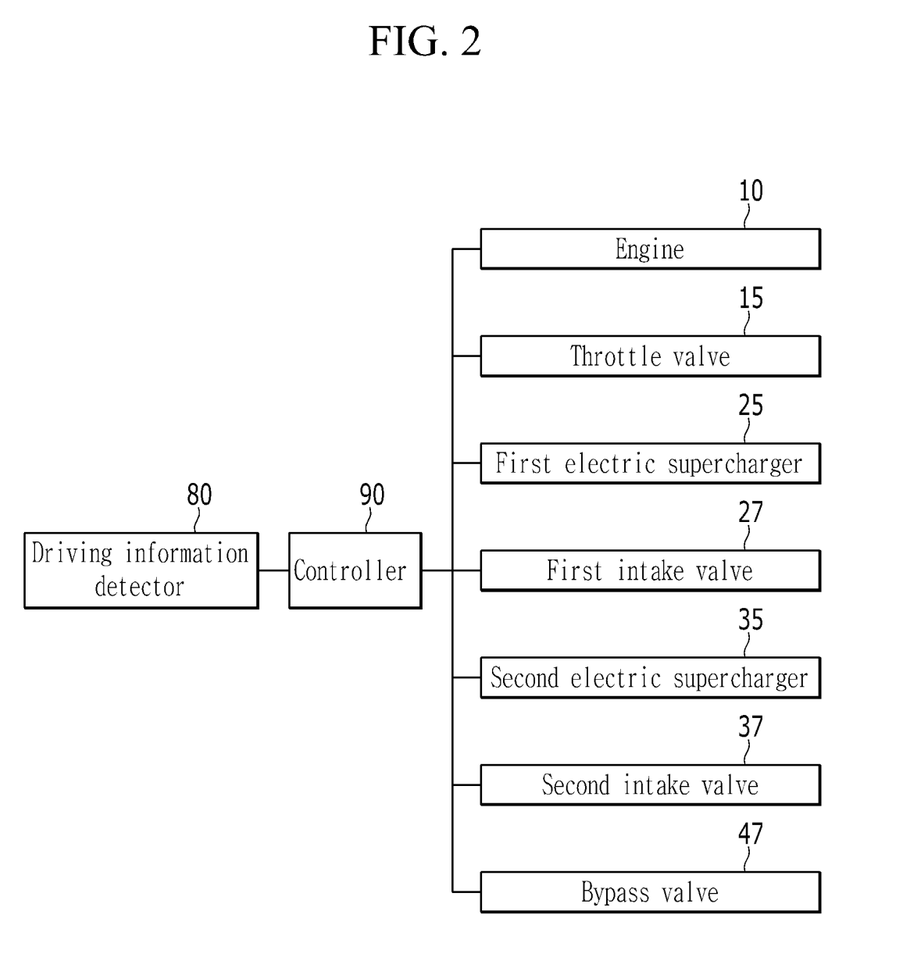
FIG. 2 is a block diagram illustrating an engine system according to an exemplary form of the present disclosure.

FIG. 1 is a schematic view illustrating an engine system. FIG. 2 is a block diagram illustrating an engine system.

As shown in FIG. 1 and FIG. 2, the engine system includes an engine 10 including a plurality of cylinders generating driving torque by burning fuel, a plurality of intake lines in which external air suppled to the cylinders 11 flows, and electric superchargers disposed in the plurality of intake lines, respectively.

Intake air is supplied to the cylinder 11 of the engine 10 passing through the plurality of intake lines, and exhaust gas discharged from the cylinder 11 is exhausted to the outside through an exhaust manifold 17 and an exhaust line. In this case, an exhaust gas purifying apparatus 70 is disposed in the exhaust line.

The plurality of intake lines includes a first intake line 20 and a second intake line 30 which external air supplied to the cylinders 11 flows. However, this is not restrictive.

A bypass line 40 which connects the first intake line 20 and the second intake line 30 is disposed between the first intake line 20 and the second intake line 30. That is, the bypass line 40 is branched from the first intake line 20 and merged into the second intake line 30.

The electric superchargers disposed in the first intake line 20 and the second intake line 30, respectively, are for supplying compressed air to the cylinders. And the electric supercharger includes a motor and an electric compressor. The electric compressor is operated by the motor and compresses intake air, and the compressed intake air is supplied to the cylinders 11.

A first intake valve 27 is disposed in the first intake line 20. The first intake valve 27 may be disposed in a downstream portion of the first electric supercharger 25 disposed in the first intake line 20. Intake air amount supplied through the first intake line 20 is adjusted by opening the first intake valve 27.

A second intake valve 37 is disposed in the second intake line 30. The second intake valve 37 may be disposed in a downstream portion of the second electric supercharger 35 disposed in the second intake line 30. Intake air amount supplied through the second intake line 30 is adjusted by opening the second intake valve 37.

The first intake line 20 and the second intake line 30 are merged into a main intake line 50, and a main intercooler 54 is disposed in the main intake line 50. Supercharged air compressed by the electric supercharger is cooled by the main intercooler 54.

A bypass valve 47 is disposed in the bypass line 40. A complementary intercooler 43 may be disposed in the bypass line 40. Supercharge air compressed by the first electric supercharger 25 is cooled by the complementary intercooler 43.

An air cleaner 52 for filtering external air is disposed in an entrance of the first intake line 20 and the second intake line 30.

External air inflowing through the first intake line 20 and the second intake line 30 is supplied to the cylinders 11 through an intake manifold 13. A throttle valve 15 is disposed in the intake manifold 13, and adjusts air amount supplied to the cylinder 11.

The engine system according to an exemplary form of the present disclosure may further include a driving information detector 80 detecting driving information of a vehicle, and a controller 90 controlling operations of the first intake valve 27, the second intake valve 37, the bypass valve 47, the first electric supercharger 25, the second electric supercharger 35, and the throttle valve 15 based on the driving information.

The driving information detector 80 detects the driving information including an engine torque, an engine speed, and a desired torque of a driver. The driving information is transmitted to the controller 90.

The controller 90 may be provided as at least one processor operating by a predetermined program, and the predetermined program performs each step of a method for controlling the engine system according to an exemplary form of the present disclosure The controller 90 determines a driving region of the engine based on the driving information detected by the driving information detector 80, and controls the electric superchargers to be operated in a single mode, a serial mode, or a parallel mode based on the driving region of the engine.

Figure 3:
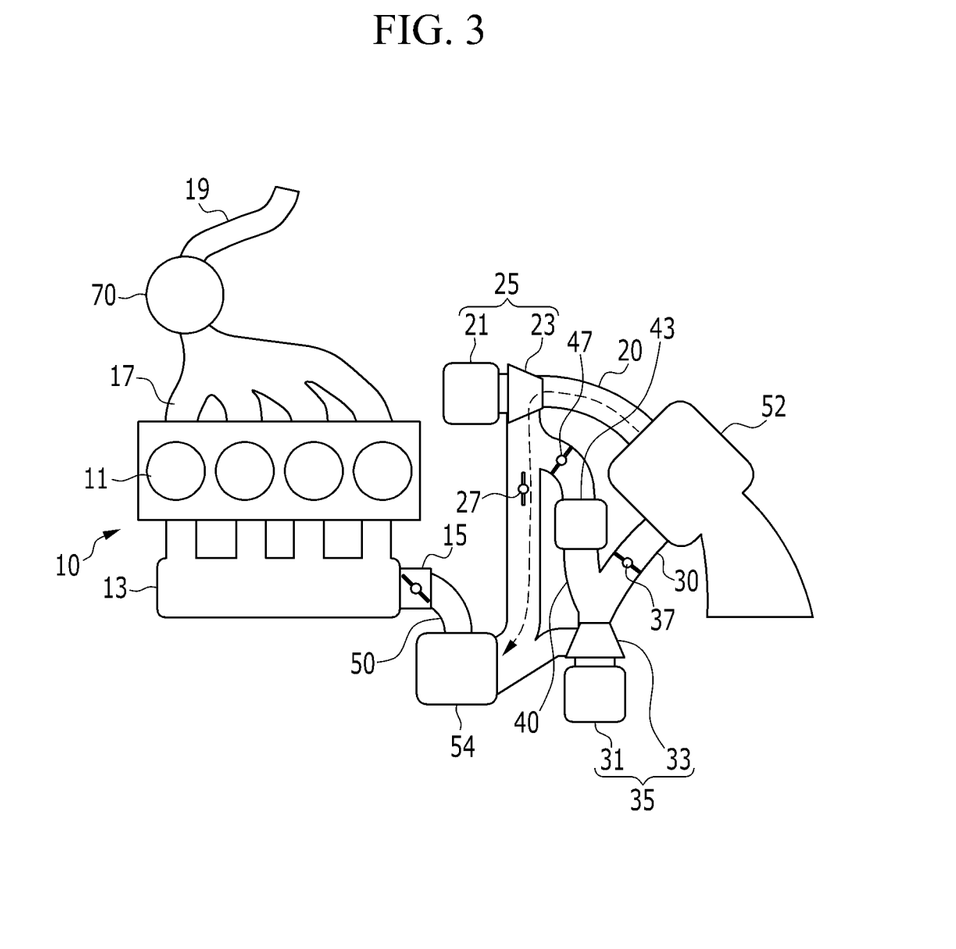
FIG. 3 is a schematic view illustrating an operation of an engine system according to an exemplary form of the present disclosure in a single mode.

The single mode is a mode that intake air compressed by one of a plurality of electric superchargers is supplied to the cylinder 11. Referring to FIG. 3, in the single mode, the controller 90 controls the second intake valve 37 and the bypass valve 47 to be closed, the second electric supercharger 35 to be stopped, the first intake valve 27 to be opened and the first electric supercharger 25 to be operated, such that intake air compressed by the first electric supercharger 25 and supplied to the cylinder 11. In another case, the controller 90 controls the first intake valve 27 and the bypass valve 47 to be closed, the first electric supercharger 25 to be stopped, the second intake valve 37 to be opened, and the second electric supercharger 35 to be operated, such that intake air is compressed by the second electric supercharger 35 and supplied to the cylinder 11.

Figure 4:
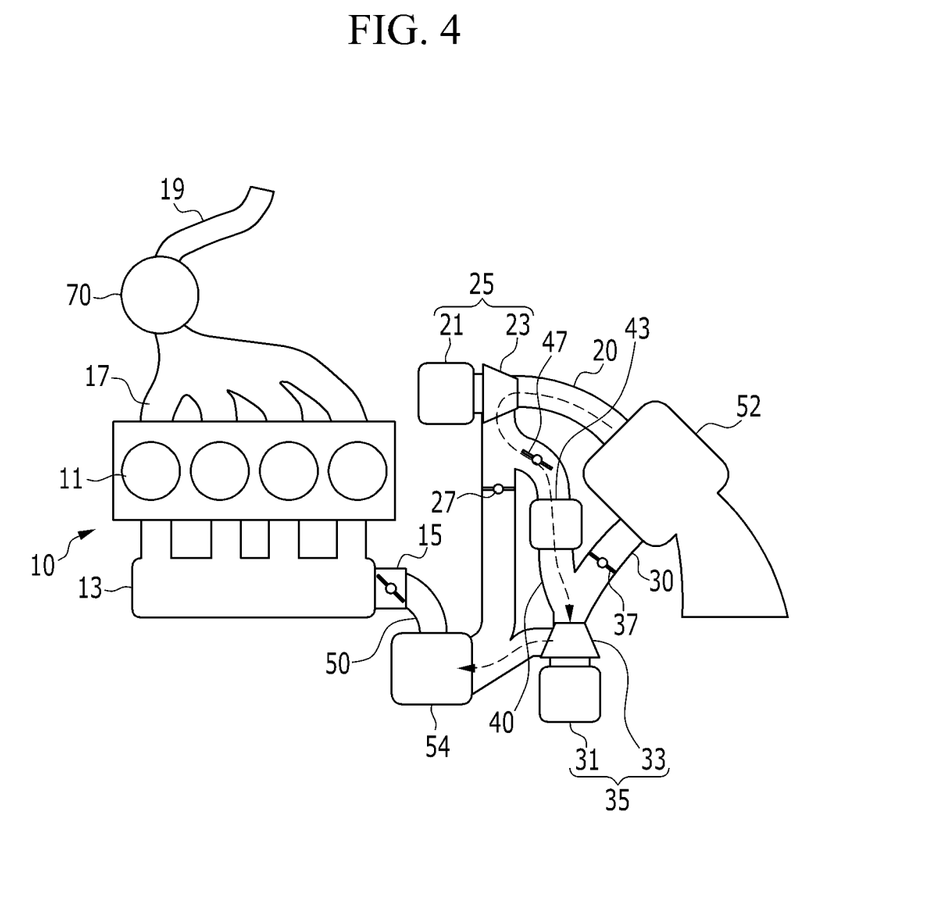
FIG. 4 is a schematic view illustrating an operation of an engine system according to an exemplary form of the present disclosure in a serial mode.

The serial mode is a mode that intake air is doubly compressed by the first electric supercharger 25 and the second electric supercharger 35 and supplied to the cylinder 11. That is, intake air is compressed by the first electric supercharger 25, and then intake air compressed by the first electric supercharger 25 is additionally compressed by the second electric supercharger 35. Referring to FIG. 4, in the serial mode, the controller 90 controls the first intake valve 27 and the second intake valve 37 to be closed, the bypass valve 47 to be opened, and the first electric supercharger 25 and the second electric supercharger 35 to be operated, such that intake air is compressed by the first electric supercharger 25 and the second electric supercharger 35 and suppled to the cylinder 11.

Figure 5:
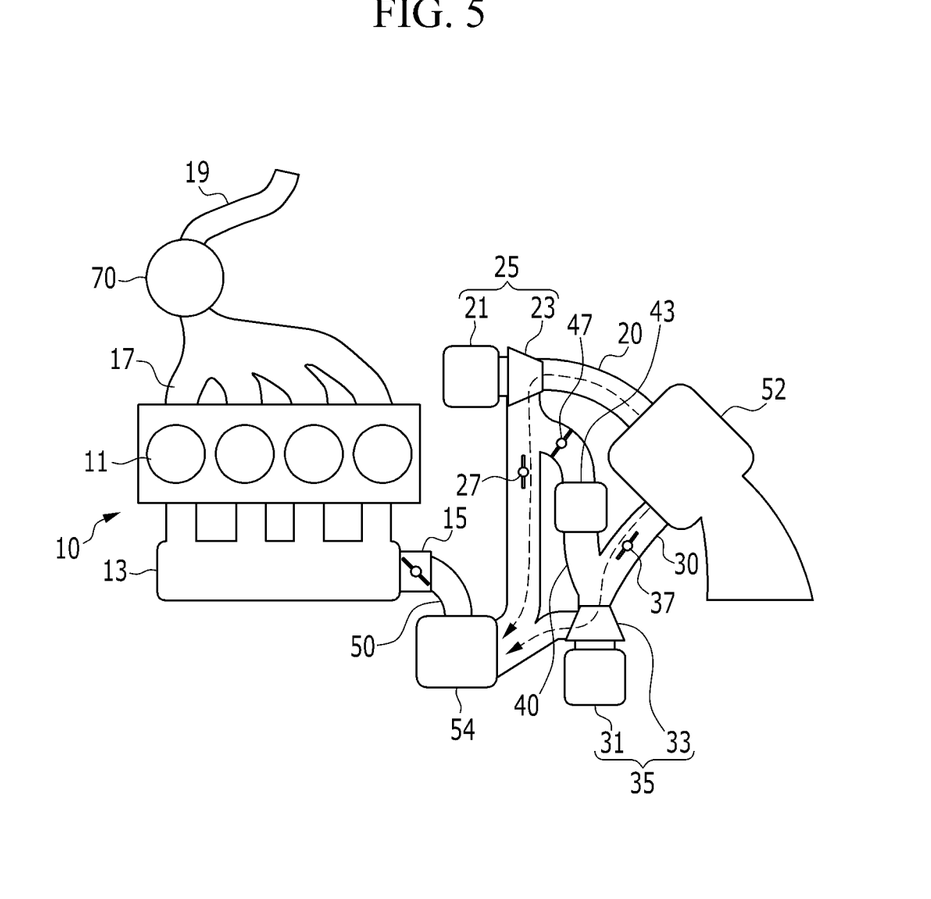
FIG. 5 is a schematic view illustrating an operation of an engine system according to an exemplary form of the present disclosure in a parallel mode.

The parallel mode is a mode that intake air respectively compressed by the first electric supercharger 25 and by the second electric supercharger 35 is supplied to the cylinder 11. Referring to FIG. 5, in the parallel mode, the controller 90 controls the bypass valve 47 to be closed, the first intake valve 27 and the second intake valve 37 to be opened, and the first electric supercharger 25 and the second electric supercharger 35 to be operated, such that intake air compressed by the first electric supercharger 25 and the second electric supercharger 35 is supplied to the cylinder 11.

Hereinafter, operations of the engine system according to an exemplary form of the present disclosure will be described in detail with reference to accompanying drawings.

Figure 6:
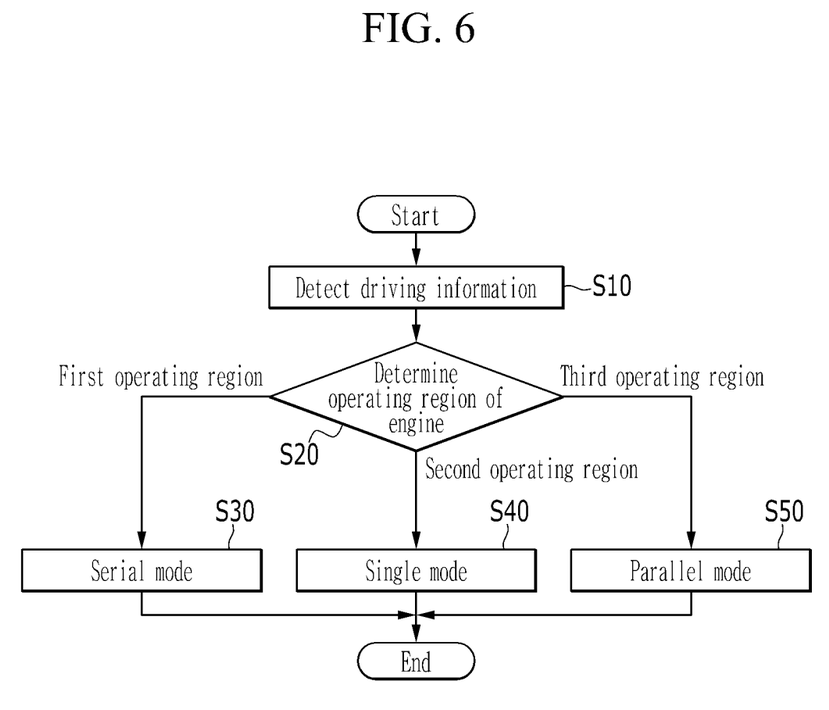
FIG. 6 is a flowchart illustrating a method for controlling an engine system according to an exemplary form of the present disclosure.

FIG. 6 is a flowchart illustrating a method for controlling an engine system according to an exemplary form of the present disclosure.

As shown in FIG. 6, the driving information detector 80 detects driving information including an engine speed and an engine torque, and the driving information detected by the driving information detector 80 is transmitted to the controller 90 at step S10.

Figure 7:
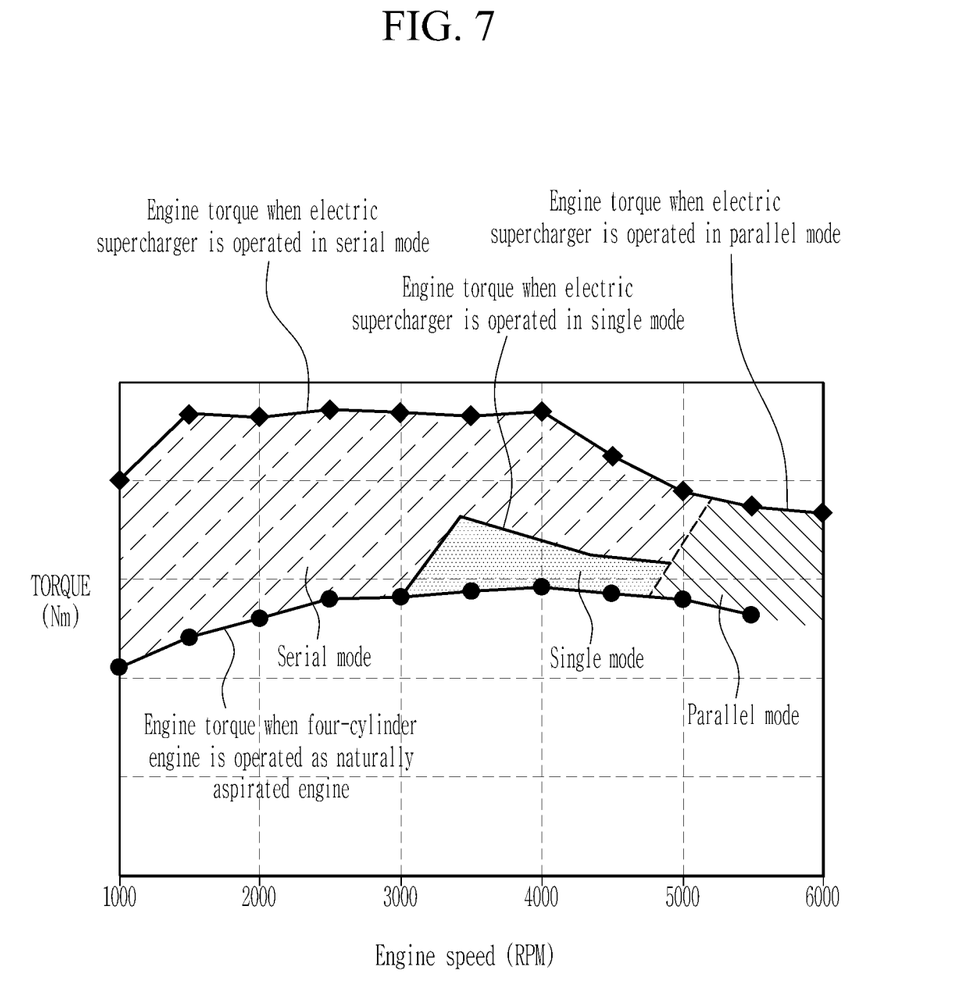
FIG. 7 is a graph illustrating an operating region of the engine system according to an exemplary form of the present disclosure.

The controller 90 determines an operating region of the engine based on the driving information detected by the driving information detector 80 at step S20. Referring to FIG. 7, the operating region of the engine may be divided into a low speed and low load region, a low speed and high load region, a middle speed and middle load region, a middle speed and high load region, a high speed and middle load region and a high speed and high load region.

The controller 90 controls the electric supercharger 25 and 35 to be operated in the single mode, the serial mode, or the parallel mode based on the operating region of the engine.

When the operating region of the engine is the low speed and low load region, the low speed and high load region, or the middle speed and high load region (hereinafter, will be referred to a 'first operating region'), the controller 90 controls the electric superchargers 25 and 35 to be operated in the serial mode at step S30. In the serial mode, the controller 90 controls the first intake valve 27 and the second intake valve 37 to be closed, the bypass valve 47 to be opened, and the first electric supercharger 25 and the second electric supercharger 35 to be operated, such that intake air is compressed by the first electric supercharger 25 and the second electric supercharger 35 and suppled to the cylinder 11.

When the operating region of the engine is in the middle speed and middle load region (hereinafter, will be referred to a 'second operating region'), the controller 90 controls the electric superchargers 25 and 35 to be operated in the single mode at step S40. In the single mode, the controller 90 controls the second intake valve 37 and the bypass valve 47 to be closed, the second electric supercharger 35 to be stopped, the first intake valve 27 to be opened and the first electric supercharger 25 to be operated, such that intake air is compressed by the first electric supercharger 25 and supplied to the cylinder 11. In another case, the controller 90 controls the first intake valve 27 and the bypass valve 47 to be closed, the first electric supercharger 25 to be stopped, the second intake valve 37 to be opened, and the second electric supercharger 35 to be operated, such that intake air is compressed by the second electric supercharger 35 and supplied to the cylinder 11.

When the operating region of the engine is the high speed and middle load region or the high speed and high load region (hereinafter, will be referred to a 'third operating region'), the controller 90 controls the electric superchargers 25 and 35 to be operated in the parallel mode at step S50. In the parallel mode, the controller 90 controls the bypass valve 47 to be closed, the first intake valve 27 and the second intake valve 37 to be opened, and the first electric supercharger 25 and the second electric supercharger 35 to be operated, such that intake air compressed by the first electric supercharger 25 and the second electric supercharger 35 is supplied to the cylinder 11.

Meanwhile, when the operating region of the engine is in a low load region, intake air is not compressed by the electric superchargers and the engine is operated as a NA (natural aspiration) engine.

When supercharged air is supplied to the cylinder 11 by using two electric superchargers, there is a problem that an operating point of the electric supercharger is close to a surge line, thus the electric superchargers do not normally operate and the electric superchargers are oscillated.

In order to prevent this problem, it needs to control the electric superchargers in appropriate driving mode.

According to an exemplary form of the present disclosure, in an low air amount region (e.g., first operating region or second operating region) that intake air mount supplied to the cylinder 11 is relatively low, the electric superchargers are operated in the serial mode or the single mode, and thus it is possible to operate the electric superchargers in the optimal efficiency operating point.

Figure 8:
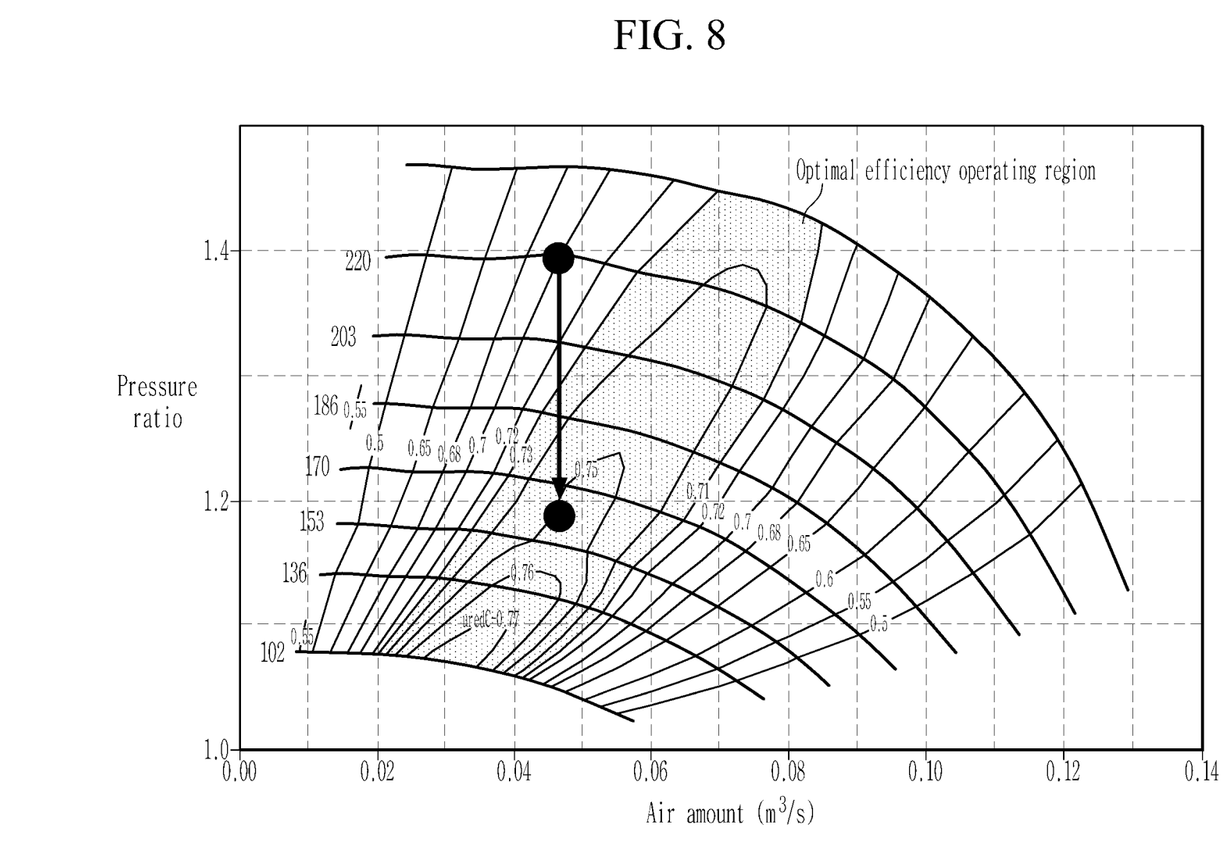
FIG. 8 and FIG. 9 are graphs illustrating operating point of an electric supercharger according to an exemplary form of the present disclosure.

As shown in FIG. 8, when the electric superchargers are operated in the serial mode in the low air amount region, a pressure ratio between an upstream side of the electric supercharger and a downstream side of the electric supercharger becomes about 1.4. In this case, the operating point of the electric supercharger deviates from the optimal efficiency operating point and energy efficiency is deteriorated. However, when the electric superchargers are operated in the serial mode, since intake air is doubly compressed by the two electric superchargers, the pressure ratio of each electric supercharger becomes about 1.18. Therefore, the electric supercharger is operated in the optimal efficiency operating point and energy efficiency is improved.

Further, in a high air amount region (e.g., third operating region) that intake air supplied to the cylinder 11 is relatively high, the electric superchargers are operated in the parallel mode, and thus it is possible to operate the electric superchargers in the optimal efficiency operating point.

Figure 9:
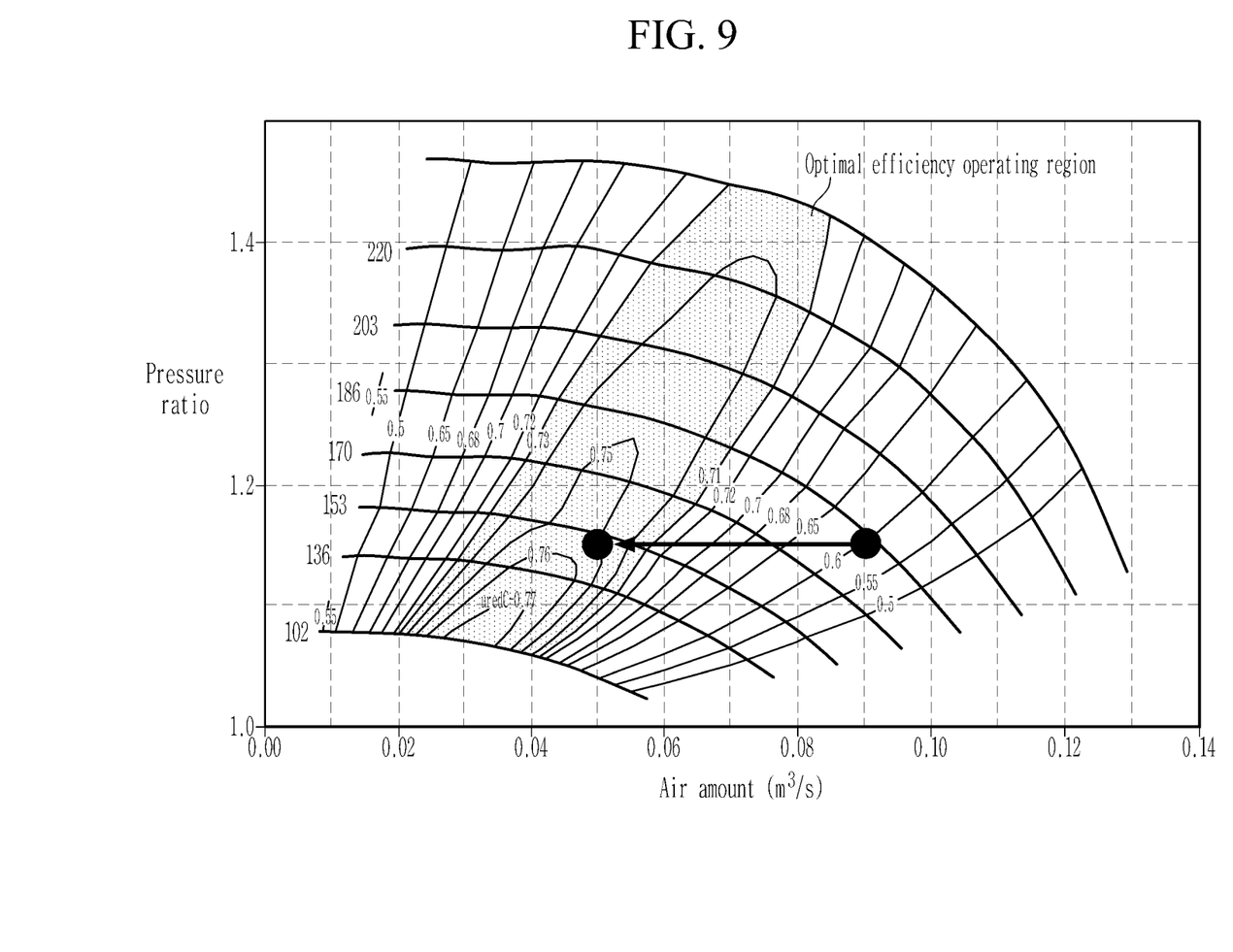

As shown in FIG. 9, when the electric superchargers are operated in the single mode in the high air amount region, air amount compressed by the electric supercharger becomes about 0.09 ($m^2$/s). In this case, the operating point of the electric supercharger deviates from the optimal efficiency operating point and energy efficiency is deteriorated. However, when the electric superchargers are operated in the parallel mode, since intake air is compressed by each of the two electric superchargers, air amount compressed by the each electric supercharger becomes about 0.0459 ($m^2$/s). Therefore, the electric supercharger is operated in the optimal efficiency operating point and energy efficiency is improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

10: engine
11: combustion chamber
13: intake manifold
15: throttle valve
17: exhaust manifold
20: first intake line
25: first electric supercharger
27: first intake valve
30: second intake line
35: second electric supercharger
37: second intake valve
40: bypass line
43: complementary intercooler
47: bypass valve
50: main intake line
52: air cleaner
54: main intercooler
70: exhaust gas purifying apparatus
80: driving information detector
90: controller

What is claimed is:
1. An engine system comprising:
an engine including a plurality of cylinders generating a driving torque by burning fuel;
a first intake valve disposed in a first intake line in which intake air flows and is supplied to the plurality of cylinders;

a second intake valve disposed in a second intake line in which intake air flows and is supplied to the plurality of cylinders;
a first electric supercharger disposed in the first intake line;
a second electric supercharger disposed in the second intake line;
a bypass valve disposed in a bypass line connecting the first intake line and the second intake line; and
a controller configured to control the first electric supercharger and the second electric supercharger to be operated in a single mode, a serial mode, or a parallel mode based on an operating region of the engine determined by driving information,
wherein:
the intake air is compressed by one of the first electric supercharger and the second electric supercharger and then supplied to the plurality of cylinders in the single mode,
the intake air is doubly compressed by the first electric supercharger and the second electric supercharger and supplied to the plurality of cylinders in the serial mode, or the intake air is respectively compressed by the first electric supercharger and by the second electric supercharger and supplied to the plurality of cylinders in the parallel mode,
when the operating region of the engine is in a middle speed and middle load region, the controller controls the first and second electric superchargers to be operated in the single mode,
when the operating region of the engine is a low speed and low load region, a low speed and high load region, or a middle speed and high load region, the controller controls the first and second electric superchargers to be operated in the serial mode, and
when the operating region of the engine is a high speed and middle load region or a high speed and high load region, the controller controls the first and second electric superchargers to be operated in the parallel mode.

2. The engine system of claim 1, wherein: in the single mode,
the controller is configured to:
control the second intake valve and the bypass valve to be closed, the second electric supercharger to be stopped, the first intake valve to be opened, and the first electric supercharger to be operated, such that the intake air compressed by the first electric supercharger is supplied to the plurality of cylinders, or
control the first intake valve and the bypass valve to be closed, the first electric supercharger to be stopped, the second intake valve to be opened and the second electric supercharger to be operated, such that the intake air compressed by the second electric supercharger is supplied to the plurality of cylinders.

3. The engine system of claim 1, wherein: in the serial mode,
the controller is configured to:
control the first intake valve and the second intake valve to be closed, the bypass valve to be opened, the first electric supercharger and the second electric supercharger to be operated, such that the intake air doubly compressed by the first electric supercharger and the second electric supercharger is supplied to the plurality of cylinders.

4. The engine system of claim 1, wherein: in the parallel mode,
the controller is configured to:
controls the bypass valve to be closed, the first intake valve and the second intake valve to be opened, and the first electric supercharger and the second electric supercharger to be operated, such that the intake air compressed by the first electric supercharger and the intake air compressed air compressed by the second electric supercharger are supplied to the plurality of cylinders.

5. The engine system of claim 1, wherein:
the first intake valve is disposed in a downstream portion of the first electric supercharger, and
the second intake valve is disposed in an upstream portion of the second electric supercharger.

6. The engine system of claim 1, further comprising:
a main intercooler disposed in a main intake line that the first intake line and the second intake line are merged.

7. The engine system of claim 1, further comprising:
a complementary intercooler disposed in the bypass line.

8. A method for controlling an engine system including a first intake valve disposed in a first intake line in which intake air supplied to a cylinder of an engine flows, a second intake valve disposed in a second intake line in which intake air supplied to the cylinder of the engine flows, a first electric supercharger disposed in the first intake line, a second electric supercharger disposed in the second intake line, and a bypass valve disposed in a bypass line connecting the first intake line and the second intake line, the method comprising:
detecting, by a driving information detector, a driving information including an engine speed and an engine torque of the engine;
determining, by a controller, an operating region of the engine based on the driving information; and
controlling, by the controller, the first electric supercharger and the second electric supercharger to be operated in a single mode, a serial mode, or a parallel mode based on the operating region,
wherein the intake air is compressed by one of the first electric supercharger and the second electric supercharger and supplied to the cylinder in the single mode, the intake air is doubly compressed by the first electric supercharger and the second electric supercharger and supplied to the cylinder in the serial mode, or the intake air is respectively compressed by the first electric supercharger and by the second electric supercharger and supplied to the cylinder in the parallel mode,
wherein: in the single mode,
the second intake valve and the bypass valve are closed, the second electric supercharger is stopped, the first intake valve is opened, and the first electric supercharger is operated, such that the intake air compressed by the first electric supercharger is supplied to the cylinder, or
the first intake valve and the bypass valve are closed, the first electric supercharger is stopped, the second intake valve is opened, and the second electric supercharger is operated, such that the intake air compressed by the second electric supercharger is supplied to the cylinder, and
the first electric supercharger or the second electric supercharger is operated in the single mode when the operating region of the engine is in a middle speed and middle load region.

9. The method of claim 8, wherein: in the serial mode,
the first intake valve and the second intake valve are closed, the bypass valve is opened, and the first electric supercharger and the second electric supercharger are operated, such that the intake air doubly compressed by the first electric supercharger and the second electric supercharger is supplied to the cylinder.

10. The method of claim 8, wherein: in the parallel mode, the bypass valve is closed, the first intake valve and the second intake valve are opened, and the first electric supercharger and the second electric supercharger are operated, such that the intake air compressed by the first electric supercharger and by the second electric supercharger is supplied to the cylinder.

11. The method of claim 8, wherein:
the first and second electric superchargers are operated in the serial mode when the operating region of the engine is a low speed and low load region, a low speed and high load region, or a middle speed and high load region.

12. The method of claim 11, wherein:
the first and second electric superchargers are operated in the parallel mode when the operating region of the engine is a high speed and middle load region or a high speed and high load region.

\* \* \* \* \*